Jan. 26, 1954   E. G. ERSON ET AL   2,667,385
DYNAMIC AND FLUID PRESSURE BRAKE INTERLOCK APPARATUS
Filed Oct. 28, 1950   2 Sheets-Sheet 1

INVENTORS
Erik G. Erson
Glenn M. Thomas
BY
Frank E. Miller
ATTORNEY

Jan. 26, 1954     E. G. ERSON ET AL     2,667,385
DYNAMIC AND FLUID PRESSURE BRAKE INTERLOCK APPARATUS
Filed Oct. 28, 1950     2 Sheets-Sheet 2

INVENTORS
Erik G. Erson
BY Glenn M. Thomas
Frank E. Miller
ATTORNEY

Patented Jan. 26, 1954

2,667,385

UNITED STATES PATENT OFFICE 2,667,385

DYNAMIC AND FLUID PRESSURE BRAKE INTERLOCK APPARATUS

Erik G. Erson, Wilkinsburg, and Glenn M. Thomas, Dravosburg, Pa., assignors to Westinghouse Air Brake Company, a corporation of Pennsylvania Application October 28, 1950, Serial No. 192,788

16 Claims. (Cl. 303—3)

This invention relates to fluid pressure brakes and more particularly to the type for use on railway locomotives.

Both steam and single and multiple unit diesel electric locomotives are used on modern railways and in many instances the driving motors of the diesel electric locomotives are employed as generators to provide dynamic braking during descent of a grade or at other times when it is desired to brake the locomotive and connected cars of a train. The brakes on freight cars are controlled on the automatic principle through the medium of a brake pipe. In certain passenger service the brakes on the cars of a train are also controlled only on the automatic principle through the medium of a brake pipe; but in other passenger service, the cars are also provided with electro-pneumatic straight air apparatus whereby the brakes may be selectively controlled on the straight air principle as well as on the automatic principle. In all types of service it is desirable to be able to release the brakes on the locomotive independently of the brakes on cars of a train and to prevent reapplication thereof without some definite operation on the part of the engineer. Moreover where dynamic brakes are employed it is desirable, if an application of the fluid pressure brakes on the locomotive be in effect, that such application be automatically released when the dynamic brakes are cut into operation or that an automatic or straight air application of locomotive brakes be prevented while the dynamic brakes are in operation. However, it is desirable to be able to apply and release the fluid pressure brakes on the locomotive independently of the brakes on the cars of a train at any time.

In order to provide a brake equipment which would meet all of the above conditions, for various types of service the No. 24RL locomotive brake equipment, disclosed in Westinghouse Air Brake Company's Instruction Pamphlet No. 5066 dated March 1948 was evolved.

The principal object of the invention is the provision of certain improvements in the 24RL locomotive brake equipment which improvements will hereinafter be particularly pointed out.

Other objects and advantages of the invention will become apparent from the following more detailed description of the invention.

In the accompanying drawings.

DESCRIPTION

The fluid pressure brake equipment embodying the invention may be generally like that disclosed in the above mentioned Instruction Pamphlet in view of which only such parts of the equipment are shown in the drawings as deemed necessary to a clear understanding of the invention and for like reasons the following description thereof will also be limited.

Figures 1, 5, 6:
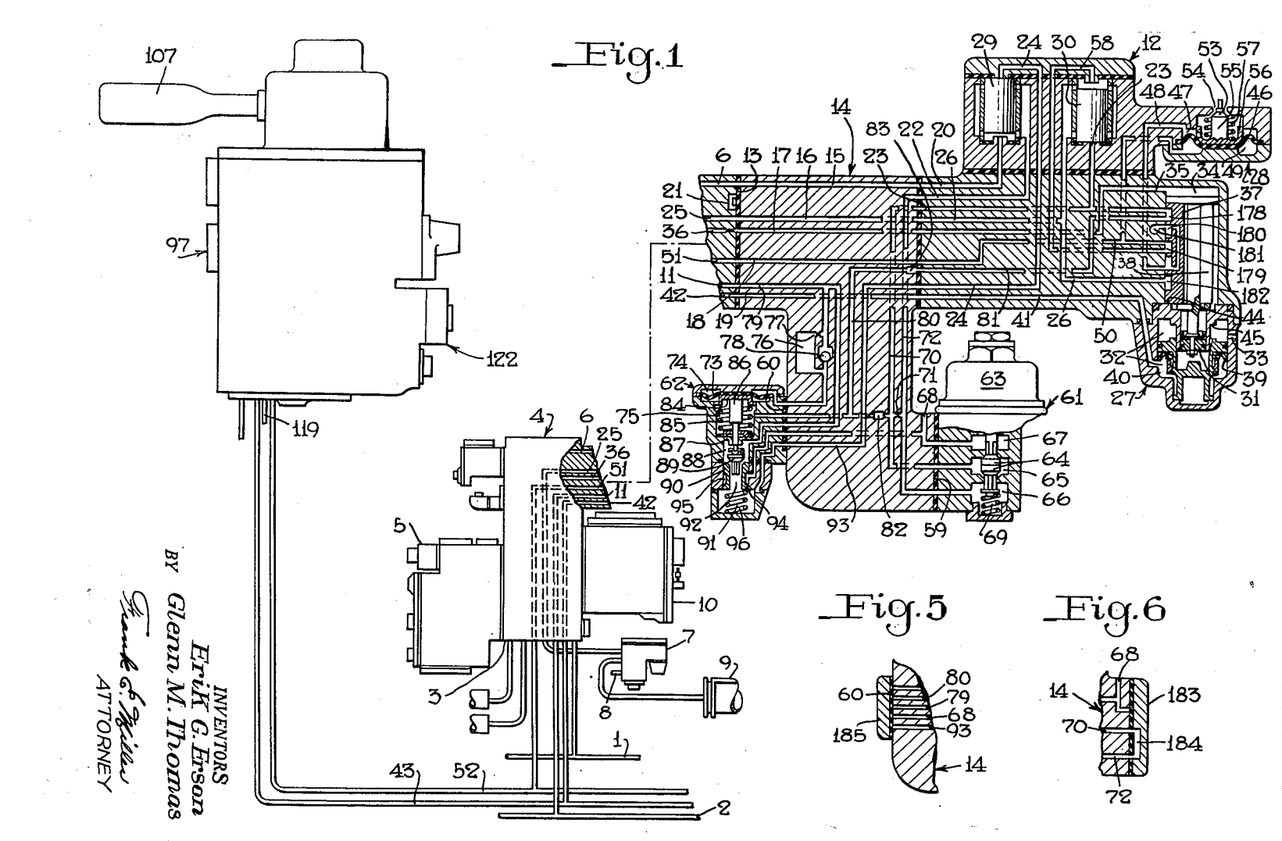
Fig. 1 is a diagrammatic view, partly in section and partly in outline of a portion of a 24RL locomotive brake equipment embodying the invention.
Figs. 5 and 6 are diagrammatic views of modifications of a brake controlling valve device shown in Fig. 1.

Further, the brake equipment shown in Fig. 1 of the drawings is particularly adapted for use on locomotives of the diesel type in which the propulsion motors are adapted to act as generators to provide dynamic braking and which may haul trains on which the brakes are adapted to be controlled—either automatically through a brake pipe or electro-pneumatically through a straight air pipe, which pipes are designated in the drawings by the reference numerals 1 and 2, respectively.

An engineer's automatic brake valve device (not shown) at the leading end of the locomotive is adapted to either reduce the pressure of fluid in the brake pipe 1 and recharge the brake pipe with fluid under pressure or to effect supply or release of fluid under pressure to or from the straight air pipe 2.

The pipes 1 and 2 both are connected to a pipe bracket 3 of a brake controlling valve device 4 one of which will be provided on a steam locomotive or a single unit locomotive or each unit of a multiple unit locomotive. The brake controlling valve device 4 comprises a service portion 5 adapted to respond to a service reduction in pressure in the brake pipe 1 to supply fluid at a pressure proportional to the degree of such reduction to a passage 6 from which it is adapted to flow, via a communication, to be hereinafter described, to a fluid pressure operable brake applying means in the form of a relay valve device 7 for operating same to provide a corresponding pressure from a fluid pressure supply pipe 8, in a brake cylinder device 9 for operating said brake cylinder device to effect an automatic service application of brakes on the locomotive. The brake controlling valve device 4 further comprises an emergency portion 10 adapted to operate along with the service portion in response to an emergency reduction in pressure of fluid in the brake pipe 1 to supply fluid to passage 6 and thence to the relay valve device 7 for causing operation of the brake cylinder device 9 to effect an emergency application of the locomotive brakes. In response to recharging the brake pipe 1 with fluid under pressure following either a service or an emergency application of brakes the portions 5 and 10 of the brake controlling valve device are adapted to return to a release position for venting passage 6 to cause operation of the relay valve device 7 to release fluid under pressure from the brake cylinder device 9 to release the locomotive brakes.

Upon supply of fluid under pressure to the straight air pipe 2, such fluid will flow into a passage 11 in the pipe bracket 3 and thence, via a communication to be hereinafter described, to the relay valve device 7 for effecting operation thereof and thereby of the brake cylinder device 9 to apply the locomotive brakes. Upon release of fluid under pressure from the straight air pipe 2 fluid under pressure will be released from the relay valve device 7 and brake cylinder device 9 to release the locomotive brakes.

According to the invention we provide an improved independent application and release valve device 12 adapted to be mounted directly on a mounting face 13 of the pipe bracket 3 when the equipment is to be used on a locomotive not capable of dynamic braking and which will be employed in freight service and in passenger service where no straight air pipe 2 is available for electro-pneumatic control of locomotive and car brakes. As shown in Fig. 1 the independent application and release valve device 12 however is carried by a filler piece 14 in turn mounted on the pipe bracket 3 over the mounting face 13, this combination constituting an equipment particularly adapted though not limited for use on locomotives adapted to control brakes on the locomotive and cars of a train either automatically through the brake pipe 1 or electro-pneumatically through the straight air pipe 2 and on which locomotive dynamic braking may or may not be employed and embodying various interlocks and arrangements for charging over the equipment to suit various conditions or types of service, as will be later explained, it being noted however that the filler piece 14 has through passages 15, 16, 17, 18 and 19 connecting passages in the mounting face on bracket 3 with aligned passages in the valve device 12 which would register if the filler piece 13 were not employed and said valve device 12 were mounted directly on the bracket 3, as for example, passage 6 in the bracket 3 is shown in the drawing connected through passage 15 in the filler piece 14 to an aligned passage 20 in the valve device 12, and passage 6 would register with passage 20 if the filler piece 14 were not employed. A cavity 21 in the bracket 3 is closed by the filler piece 14 but if said filler piece were not employed said cavity would establish communication between two passages 22 and 23 in the valve device 12. The straight air pipe passage 11 in the bracket would open to a passage 24 in the valve device 12 if the filler piece 14 were removed, but when applied such communication is closed for reasons to be hereinafter described. It is to be noted that passage 16 in the filler piece 14 opens a passage 25 in the bracket to a passage 26 in the valve device 12, the passage 25 leading to the relay valve device 7, whereby supply of fluid under pressure to and its release from said relay valve device occurs via passage 26.

The independent application and release valve device 12 comprises a selector valve device 27, a brake release valve device 28 and two double check valves 29 and 30.

The selector valve device 27 comprises a piston 31 subject on one side to atmospheric pressure in a chamber 32 which is vented through a passage 33 and subject on the opposite side in a valve chamber 34 to fluid at the pressure in the main reservoir (not shown) on the locomotive which reservoir is connected to chamber 34 via a passage 35 in the interlock valve device, passage 17 in the filler piece 14 and a passage 36 in the pipe bracket 3. A slide valve 37 contained in chamber 34 is connected by a stem 38 to piston 31 for movement therewith.

Below the piston 31 there is a coaxially arranged piston 39 of larger diameter subject on one side to atmospheric pressure in chamber 32 and open at the opposite side to a chamber 40 which is connected through a passage 41 in the independent application and release valve device 12, passage 19 in the filler piece 14 and a passage 42 in the pipe bracket 3 to an actuating pipe 43. When the actuating pipe 43 and chamber 40 are substantially void of fluid under pressure, main reservoir pressure in valve chamber 34 acting on piston 31 will move said piston and the slide valve 37 to a lower or normal position in which these parts are shown in the drawing and which is defined by engagement of said slide valve with a shoulder 44 in the casing. When fluid at sufficient pressure is present in the actuating pipe 43 and piston chamber 40 to provide a force on piston 39 which overcomes the force of main reservoir pressure in chamber 34 acting on piston 31, the piston 39 will shift piston 31 and the slide valve 37 to a brake release position defined by contact between piston 39 and a casing shoulder 45.

The brake release valve device 28 comprises a movable abutment preferably in the form of a flexible diaphragm 46 at one side of which is a pressure chamber 47 open through a passage 48 to the seat of the selector slide valve 37, while at the opposite side of said diaphragm is a control chamber 49 open through a passage 50 to the seat of the selector slide valve 37 and also to one end of passage 18 extending through the filler piece 14, the opposite end of passage 18 being open to a passage 51 in and extending through the pipe bracket 3 for connection with an application and release pipe 52. A valve 53 contained in chamber 47 controls communication between said chamber and atmosphere by way of passage 54, said valve being formed on one end of a stem 55 the opposite end of which is connected to a follower 56 pressed against the adjacent face of diaphragm 46 by a light spring 57 whereby said valve will move with said diaphragm.

The double check valve 29 is arranged to control communication between passages 20 and 24 connected, respectively, to opposite ends of said double check valve, and passage 22 connected to a side outlet of said double check valve. When pressure of fluid in passage 20 exceeds that in passage 24 the double check valve 29 will move to an upper position, in which it is shown in the drawing, to open passage 20 to passage 22 and close passage 22 off from passage 24. When pressure of fluid in passage 24 exceeds that in passage 20 the double check valve 29 will assume a lower position for opening passage 24 to passage 22 and closing off passage 22 from passage 20. In like manner the double check valve 30 controls communication between passages 58, 23 connected, respectively, to opposite ends of said valve and a passage 26 connected to the side outlet of said valve. The passages 58, 23 and 26 are all connected to the seat of the selector slide valve 37, the passage 26 being also connected via passage 16 in the filler piece 14 to the brake cylinder relay valve device 7 and the passage 23 being connected to said filler piece as before described.

The filler piece has two mounting faces 59 and 60. The face 59 is providing for mounting a dynamic brake interlock magnet valve device 61 when the equipment is applied to a locomotive adapted to employ dynamic braking. The mounting face 60 is provided for mounting a combined dynamic brake and electro-pneumatic straight air interlock valve device 62 when the equipment is applied to a locomotive adapted to either provide dynamic braking or to control brakes on the electro-pneumatic straight air principle.

The magnet valve device 61 comprises a magnet 63 adapted to be energized when the dynamic brakes on the locomotive are in action and to be deenergized when said dynamic brakes are ineffective. The magnet valve device 61 further comprises two oppositely seating abutting valves 64 contained in a chamber 65 and adapted upon energization of magnet 63 to close communication between said chamber and a chamber 66 and to open chamber 65 to atmosphere via a chamber 67 and an atmospheric passage 68. Upon deenergization of magnet 63 a spring 69 is adapted to actuate the valves 64 to a position for opening chamber 66 to chamber 65 and for closing communication from chamber 65 to chamber 67.

Valve chamber 65 is open via a passage 70 in the filler piece to passage 23 in the independent application and release valve device 12 and also via a restricted passage or choke 71 to a passage 72 in the filler piece which latter passage is connected at one end to valve chamber 66 and at the opposite end to passage 22 in said valve device 12.

The interlock valve device 62 comprises a movable abutment preferably in the form of a flexible diaphragm 73 at opposite sides of which are chambers 74 and 75, respectively. Chamber 74 is open to a timing volume 76 preferably cast in the filler piece 14 and which is open through a timing choke 77 and a parallel arranged communication of greater flow capacity than said choke and containing a check valve 78 to a passage 79 in the filler piece. The passage 79 is open to passage 11 in the pipe bracket 3 and hence to the straight air pipe 2. The check valve 78 is arranged to prevent flow of fluid under pressure through the respective communication from passage 79 to the diaphragm chamber 74 but to open on reverse flow.

The chamber 75 below the diaphragm 73 is open to a passage 80 in the filler piece 14 which passage is connected to a passage 81 in the independent application and release valve device 12 and also adapted to be opened to passage 79 in the filler piece through a communication shown in the drawing as closed by a plug 82. When the plug 82 is in the position in which it is shown in the drawing it closes direct communication between passages 80 and 79, and when removed from this location is adapted to be applied to an opening 83 at the end of passage 80 where it opens to the face against which the valve device 12 is mounted. For the present it will be assumed that the plug 82 is in the location in which it is shown in the drawing and the purpose of removal from this location and applying it at its other location 83 will be hereinafter described. In actual practice the plug 82 will be screw-threaded into the position for closing communication between passages 80 and 79 and be accessible for application and removable and the opening 83 will be screw-threaded to receive said plug, it being understood that the drawing is merely diagrammatic and illustrative. A diaphragm follower 84 in chamber 75 is urged against the adjacent face of diaphragm 73 with a chosen force by a spring 85 contained in said chamber and acting on said follower. A stem 86 secured at one end to the follower 84 extends through chamber 75 and slidably through a casing wall 87 into a chamber 88 which is open directly to the straight air pipe 2 through the passages 79 and 11. A valve 89 contained in chamber 88 and connected to the end of stem 86 for movement therewith is arranged to cooperate with a seat provided on one end of a movable plunger 90, which is slidably mounted in the casing, to control communication between said chamber and a chamber 91 via an axial passage 92 through said plunger. The chamber 91 is open through a passage 93 in the filler piece 14 to passage 24 in the independent application and release valve device 12 and contains a valve 94 formed on the end of plunger 90 and arranged to cooperate with a seat in the casing to control communication between said chamber and an annular cavity 95 provided in the exterior surface of said plunger under said valve and which cavity is in constant communication with atmosphere through passage 68 in the filler piece 14. A light seating spring 96 in chamber 91 acts on the valve 94 for urging it to its seat.

The actuating pipe 43 and application and release pipe 52 connect the pipe bracket 3 to an engineers' independent brake valve device 97.

Figures 2, 3:
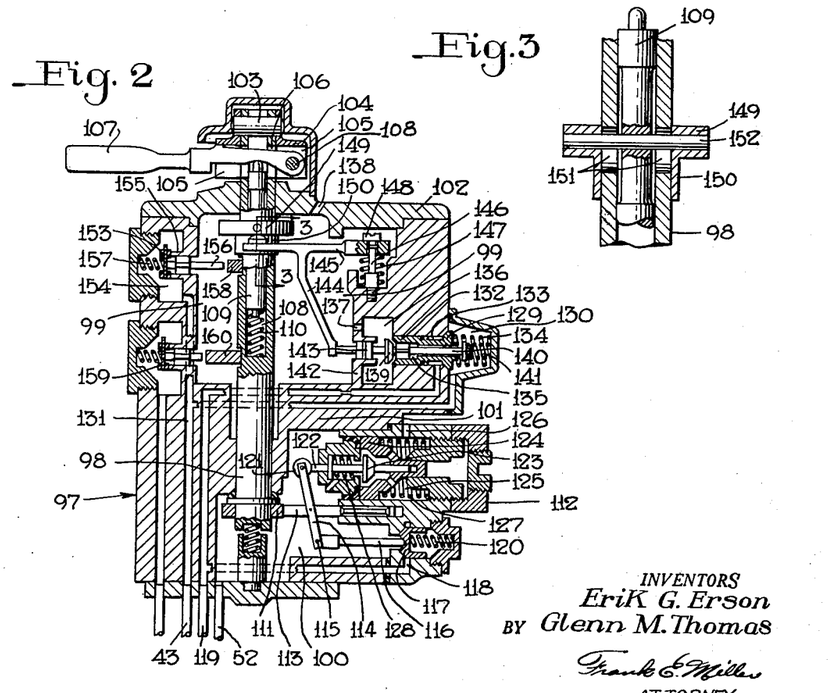
Fig. 2 is a sectional view of an engineer's independent brake valve device shown in outline in Fig. 1.
Fig. 3 is a sectional view taken on the line 3—3 in Fig. 2.

As shown in Fig. 2, the preferred form of brake valve device 97 comprises a casing containing a vertically disposed rotatable shaft 98 extending through a chamber 99 and into a pressure chamber 100 and journaled adjacent one end in a bore through a partition wall 101 separating said chambers. From chamber 99 the shaft 98 extends through a journaling bore in a cover 102 to a point above the cover and on this outer end of said shaft there is secured by a pin 103 an element 104 having at either side of said shaft an opening 105 extending radially of the shaft and aligned with a corresponding opening 106 extending diametrically through said shaft. In these aligned openings there is disposed a portion of an operator's control handle 107 which at one side of the shaft is fulcrumed on a pin 108 carried by the element 104 for vertical movement in said openings relative to the shaft 98. Upon horizontal movement of handle 107 its connections with the side walls of openings 105 is adapted to turn the shaft 98.

Figures 4, 7:
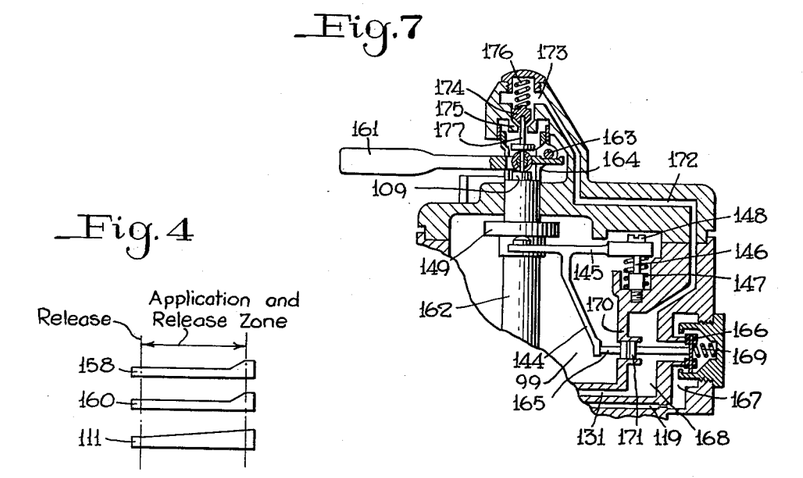
Fig. 4 is a diagrammatic development view of three cams associated with the brake valve device shown in Fig. 2.
Fig. 7 is a diagrammatic view of a modified form of engineer's independent brake valve device.

The handle 107 and shaft 98 have a release position in which they are shown in Fig. 2 and as indicated in Fig. 4 and an application and release zone of horizontal movement from said position as also indicated in Fig. 4.

Slidably mounted in an axial bore 108 in shaft 98 is a plunger 109 one end of which engages the handle 107 while the opposite end is subject to the pressure of a spring 110 in said bore. The spring 110 is effective to normally hold the handle in an elevated position, in which it is shown in the drawing, and will oppose manual depression or vertical movement of said handle downward. Whenever the handle 107 is relieved of manual pressure it will assume its elevated position under action of spring 110.

Chamber 100 in the brake valve device is constantly open to the application and release pipe 52 and contains a cam 111 on shaft 98 for controlling operation of a self-lapping fluid pressure supply and release valve mechanism 112. The valve mechanism 112 comprises a plunger 113 slidably mounted in the casing at right angles to the axis of shaft 98 and having one end arranged for control by the peripheral cam face of cam 111. Fulcrumed intermediate its ends on plunger 113 is an equalizing lever 114 one end of which is connected by a pin 115 to one end of a longitudinally movable shaft 116 the opposite end of which engages the seating face of a fluid pressure supply valve 117. The valve 117 is arranged to cooperate with a seat in the casing to control communication between chamber 100 and a chamber 118 which is open to a fluid pressure supply pipe 119. A spring 120 acts on the supply valve 117 for urging it to its seat.

The opposite end of the equalizing lever 114 carries a roller 121 engaging the end of a stem 122 upon which there is provided a fluid pressure release valve 123 arranged to cooperate with a seat on a movable piston 124 to control communication through said piston between the pressure chamber 100 at one side and a chamber 125 at the opposite side which latter chamber is open to atmosphere through a port 126. A pressure regulating spring 127 in chamber 125 acts on the piston 126 in opposition to pressure of fluid in chamber 100. A bias spring 128 carried by piston 126 acts on stem 122 to unseat the release valve 123.

With the brake valve handle 107, shaft 98 and cam 111 in their release position, in which they are shown in the drawing, the plunger 113 is permitted to move in the direction of the left-hand an extent to permit seating of the supply valve 117 by spring 118, to permit unseating of the release valve 123 by spring 128 and to also permit full extension of the pressure regulating spring 127 and thereby positioning of the piston 124 as shown in the drawing.

Upon movement of the handle 107 out of its release position into its application and release zone the cam 111 will be operated to displace the plunger 113 in the direction of the right-hand and during the initial portion of such displacement the spring 120 will hold the supply valve 117 seated to cause such rocking of the lever 114 as to seat the release valve 123. After the release valve 123 is seated the lever 114 will rock in the opposite direction and unseat the supply valve 117. Assuming that the supply valve chamber 118 is supplied with fluid under pressure from pipe 119 fluid under pressure will then flow past the unseated supply valve to pressure chamber 100 and the application and release pipe 52 and in chamber 100 act on piston 124 and move same against spring 127 in accordance with the increase in pressure of fluid in said chamber. Assuming the movement of handle 107 is stopped at any position in the application and release zone thereby fixing the position of cam 111 and displacement of plunger 113, fluid under pressure will continue to be supplied to chamber 100 and the application and release pipe 52 until the movement of piston 124, in accordance with the increase in pressure of fluid in chamber 100, permits sufficient rocking of lever 114 by the supply valve spring 120 to cause the supply valve 117 to move into contact with its seat for thereby cutting off further supply of fluid under pressure to said chamber and limiting the pressure therein in accordance with the extent of movement of handle 107 from its release position. If the handle 107 is moved further away from its release position the valve mechanism 112 will again operate as just described to provide a corresponding increase in pressure of fluid in chamber 100 and the application and release pipe 52. A maximum pressure, as for example fifty pounds, employed for normally effecting a full independent application of locomotive brakes, will be thus obtained in the extreme position of handle 107 in its application and release zone from its release position.

On the other hand, if the handle is in the application and release zone and it is moved back toward release position to a new position in said zone, the force of cam 111 will be relieved on plunger 113 and with the supply valve 117 seated by spring 120, spring 128 will rock the lever 114 and unseat the release valve 123 whereupon fluid under pressure will be released from chamber 100 and the application and release pipe 52. As the pressure of fluid is thus reduced in chamber 100 spring 127 will move piston 124 toward the release valve 123 the position of which will be fixed according to the position of handle 107. Fluid under pressure will thus continue to release from chamber 100 and pipe 52 and the piston 124 will continue its movement under action of spring 127 until said piston seats against the release valve 123 to prevent further release of such fluid under pressure, thereby limiting the reduction in such pressure in accordance with the position of handle 107 in its application and release zone. If the handle is returned to release position the spring 127 will become fully extended without moving the piston 124 into seating engagement with the release valve 123 whereby a complete release of fluid under pressure from chamber 100 and pipe 52 will occur.

It will now be seen that the valve mechanism 112 will provide fluid in chamber 100 and pipe 52 at a pressure corresponding to the position of handle 107 in the application and release zone away from its release position and will open said chamber and pipe to atmosphere in said release position.

The brake valve device 97 further comprises a valve 129 contained in a chamber 130 open through a passage 131 to the actuating pipe 43. The valve 129 is formed on one end of a plunger 132 which is slidably mounted in a bore in the casing and is arranged to control communication between chamber 130 and an annular cavity 133 provided around said plunger beneath the valve 129 and which cavity is adapted to be constantly supplied with fluid under pressure from the supply pipe 119. A spring 134 in chamber 130 acts on valve 129 for urging it to its seat.

A passageway 135 extends axially through the plunger 132 and valve 129 for opening chamber 130 to a chamber 136 at the opposite end of said plunger which latter chamber is open through a passage 137 to chamber 99, chamber 99 being in constant communication with atmosphere through a passage 138. In chamber 136 a seat is provided on plunger 132 around the end of passageway 135 for seating contact by a valve 139 contained in said chamber. The valve 139 has a stem 140 which for a portion of its length adjacent said valve is fluted and in sliding contact with the wall of passageway 135 while the remainder of said stem is of smaller cross-sectional area than said passageway and extends therethrough into chamber 130. A spring 141 in chamber 130 acts on the valve stem 140 to urge the valve 139 out of engagement with its seat on plunger 132.

Chambers 99 and 136 are separated by a partition wall 142 through which the passage 137 extends and which also has a bore in axial alignment with the valve 139, plunger 132 and valve 129. A plunger 143 is slidably mounted in this bore with one end disposed in chamber 136 in contact with valve 139 while its opposite end is disposed in chamber 99 in contact with the end of one arm of a bell crank-like lever 144.

Projecting from the lever 144 intermediate its ends is a fulcrum arm 145 loosely mounted at its end on a pin 146 one end of which is secured in the brake valve casing while a spring 147 interposed between said casing and arm holds said arm against a head 148 on the opposite end of said pin.

The other end of lever 144 engages the underside of a collar 149 provided on a sleeve 150 which is slidably mounted on the handle operated shaft 98 within chamber 99. Within the sleeve 150 the shaft 98 is provided with two diametrically opposite slots 151 (Fig. 3) and a pin 152 carried by plunger 109 extends through these slots and is connected to the collar 149 at opposite sides of said shaft. With this arrangement the spring 110 within shaft 98, when it acts to move the handle to its normal elevated plane of movement, also shifts the sleeve 150 and collar 149 on shaft 98 to an upper position which permits spring 141 acting through stem 140 on the release valve 139 to move said valve to its open position and to actuate plunger 143 to hold the opposite end of lever 144 in contact with said collar, under which condition the valve 129 will be seated by spring 134. Thus with the handle 107 in its elevated position the actuating pipe 43 will be vented past the open valve 139. Upon depression of handle 107, regardless of its horizontal position, the downward movement of plunger 109 will actuate collar 149 downwardly to rock the bell crank lever 144 in a counterclockwise direction. This rocking of lever 144 will actuate plunger 143 to first seat the valve 139 on plunger 132 and then actuate said plunger to unseat valve 129. When this occurs fluid under pressure from the supply pipe 119 will flow past valve 129 to the actuating pipe 43. When the handle 107 is relieved of manual depressing force, the spring 110 will return it and collar 149 to their normal elevated position whereupon spring 134 will close valve 129 and spring 141 will open valve 139 so as to cut off supply of fluid under pressure to and then vent the actuating pipe 43.

The independent brake valve further comprises a check valve 153 contained in a chamber 154 which is open through passage 131 to the actuating pipe 43. The check valve 153 is arranged to cooperate with a seat 155 to close communication from chamber 154 to atmosphere via bore containing a fluted stem 156 and opening said chamber to chamber 99, a spring 157 in chamber 154 acting on said check valve for urging it to its seat. The stem 156 at one end engages the check valve 153 and its opposite end is arranged for contact with the peripheral surface of a cam 158 provided on the shaft 98. The cam 158 is so designed (Fig. 4) as to actuate stem 156 to open the valve 153 for venting the actuating pipe only in the position of handle 107 most remote from release position and in which a maximum degree of independent brake application will be obtained. In all other positions of handle 107 the check valve 153 will be closed by spring 157.

The independent brake valve device 97 further comprises a check valve 159 arranged to be controlled by a cam 160 on the shaft 98 but this structure is not pertinent to the invention and will not be further described.

If desired, the independent brake valve device shown in Fig. 2 may be modified as shown in Fig. 7, the only difference being that the functions of valves 129 and 139 are performed by a different arrangement of separated valves 166 and 174, respectively.

In the brake valve device shown in Fig. 7, the handle 161 and shaft 162 perform the same functions as the corresponding parts 107 and 98, respectively, in Fig. 2 but differ structurally slightly in that the handle 161 is pivoted for vertical movement against or by the plunger 109 about a pin 163 carried by an offset portion 164 of the shaft 162. Upon depression of handle 161 the lever 144 will actuate a plunger 165 to open the supply valve 166 (corresponding functionally to the supply valve 129) for establishing communication between two chambers 167, 168 connected, respectively, to the fluid pressure supply pipe 119 and passage 131 leading to the actuating pipe 43 whereby said actuating pipe will be supplied with fluid under pressure. Upon release of manual pressure on handle 161 and return thereof to its normal elevated position by spring 110 (Fig. 2) a spring 169 will close valve 166 to cut off supply of fluid under pressure to the actuating pipe. The plunger 165 extends through a bore in a partition wall 170 separating chamber 168 from chamber 99 and on said stem is a sealing structure in the form of a piston 171 having sealing and sliding contact with the wall of said bore to prevent leakage of fluid under pressure from chamber 168 past said stem.

The chamber 168 is open through a passage 172 to a chamber 173 above the brake valve handle 161. Chamber 173 contains the release valve 174 (corresponding functionally to the release valve 139 in Fig. 2) arranged to cooperate with a seat 175 to control communication between chamber 173 and atmosphere. A spring 176 in chamber 173 acts on valve 174 to urge it to its seat.

The valve 174 is arranged above the brake valve handle 161 in axial alignment with the brake valve shaft 162 and a stem 177 depends from said valve and has at its lower end an enlarged head for engaging said handle opposite the plunger 109. With the handle 161 in its elevated position said handle is adapted to act through stem 177 to open valve 174 for venting the actuating pipe 43 while upon depression of said handle to open the supply valve 166, as above described, spring 176 is adapted to close the release valve 174.

It will therefore be seen that the valves 166 and 174 as controlled by the brake valve handle 161 perform the same functions as valves 129, 139 as controlled by handle 107. Except as above pointed out the two brake valve devices may be identical.

OPERATION

As above mentioned, the brake equipment as illustrated in Figs. 1 and 2 of the drawing is for use on locomotives arranged for dynamic braking and particularly intended for controlling fluid pressure brakes on the locomotive and cars of a train either on the automatic or electro-pneumatic straight air principle and also provides for control of the brakes on the locomotive independently of those on cars of a train, and the operation of such equipment is as follows.

Let it be assumed that the independent brake valve handle 107 or 161 is in its release position opening both the actuating pipe 43 and the application and release pipe 52 to atmosphere. With the actuating pipe 43 thus vented chamber 40 below piston 39 in the selector valve device 27 will be vented so piston 31 and slide valve 37 will be in the lower or normal position. Let it further be assumed that the dynamic brakes on the locomotive are not in operation and as a result the magnet 63 of the dynamic brake interlock magnet valve device 62 is deenergized as a result of which the valves 64 will be in their upper position in which they are shown in the drawing.

Now assume that the engineer desires to apply the brakes on the locomotive and cars of a train on the automatic principle and reduces the pressure of fluid in brake pipe 1 to accomplish same. As a result, the service, or both the service and emergency portions 5 and 10 of the brake controlling valve device 4 will operate to supply fluid under pressure to passage 6 in the bracket 3. Fluid under pressure thus supplied to passage 6 will flow through passage 15 in the filler piece 14 to passage 20 in the independent application and release valve device 12, thence past the lower end of the double check valve 29 to passage 22. From passage 22 such fluid under pressure will flow to passage 72 in the filler piece 14 past the lower unseated valve 64 in the dynamic brake interlock magnet valve device 61 to passage 70, thence to passage 23 in the valve device 12, past the lower end of the double check valve 30 to passage 26, and from passage 26 through passage 25 in the filler piece 14 and passage 25 in the pipe bracket 3 to the relay valve device 7 and operate said device and thereby the brake cylinder device 9 to apply the locomotive brakes. By reverse flow through the communication just traced fluid under pressure will be released from the relay valve device 7 to effect a release of locomotive brakes upon response of the brake controlling valve device 4 to recharging of the brake pipe 1, in the usual manner.

If the engineer desires to apply the brakes on the electro-pneumatic straight air principle he will effect a supply of fluid under pressure to the straight air pipe 2 and thence through passage 11 in the bracket 3 to passage 79 in the filler piece 14. From passage 79 such fluid under pressure will flow past the open valve 89 in the interlock valve device 62 to chamber 91 and thence through passage 93 to passage 24 in the independent application and release valve device 12. From passage 24 the fluid under pressure will flow past the upper end of the double check valve 29 to passage 22 and to the relay valve device 7 for operating same to apply the locomotive brakes, through the same communication above described in effecting an automatic application of locomotive brakes. By reverse flow through the communication just described the straight air electro-pneumatic application of brakes will be released upon release of fluid under pressure from the straight air pipe 2.

When fluid under pressure is supplied to passage 79 in the filler piece 14 for effecting an electro-pneumatic application of locomotive brakes as just described, a portion of this fluid will flow through choke 77 into the timing volume 76 and diaphragm chamber 74 above diaphragm 73 in the interlock valve device 62, while a portion of the fluid supplied past the double check valve 29 to passage 22 and thence to passage 23 will flow through a cavity 178 in the selector slide valve 37 to passage 81 and thence through passage 80 in the filler piece 14 to chamber 75 below the diaphragm 73. The choke 77 so delays the build up of pressure in chambers 76 and 74 with respect to the build up in chamber 75 however that spring 85 is enabled to prevent deflection of diaphragm 73 from its normal position, whereby the valve 89 will remain open during an electro-pneumatic application of brakes. It also remains open in releasing an electro-pneumatic straight air application of brakes since upon release of fluid under pressure from passage 79 the pressure of fluid in the timing volume 76 and diaphragm chamber 74 will reduce past the check valve 78 with the reduction in pressure in passage 79 and thus ahead of the consequent reduction in pressure in diaphragm chamber 75.

When the locomotive brakes are released if the engineer desires to apply the locomotive brakes independently of those on the train, he will turn the independent brake valve handle 107 or 161 into the application and release zone and thereby supply fluid to the application and release pipe 52 at a pressure corresponding to the desired degree of brake application. Such fluid will flow from pipe 52 through passage 51 in pipe bracket 4, passage 18 in filler piece 14 to passage 50 in the independent application and release valve device 12, thence through a cavity 179 in the selector slide valve 37 to passage 58 leading to the upper end of the double check valve 30. The check valve 30 will be moved down by such pressure whereupon fluid under pressure from passage 58 will flow to passage 26 and thence to the relay valve device 7 to cause an application of the locomotive brakes. Any desired degree of independent application of locomotive brakes may thus be obtained on the locomotive as determined by the position of the brake valve handle 107 or 161 in its application and release zone up to a maximum degree which will result if said handle is moved to the extremity of said zone most remote from release position. By reverse flow of fluid under pressure through the communication just described the pressure of fluid may be reduced to any selected degree in the relay valve device 7 in response to movement of handle 107 or 161 back toward release position to any selected position. Return of handle 107 or 161 to its release position will effect a complete release of such an application of the locomotive brakes.

When, due to either a reduction in pressure in brake pipe 1 or the supply of fluid under pressure to the straight air pipe 2, the brakes on the locomotive are applied, if the engineer desires to reduce the degree of such application or to effect a complete release of the application independently of said pipes and hence independently of the brakes on cars of a connected train he may do so by depressing the independent brake valve handle 107 or 161 for supplying fluid under pressure to the actuating pipe 43 and thence to piston chamber 40 in the selector valve device 27 in response to which the selector slide valve 37 will be moved to its upper release position. In this position of slide valve 37 passage 81 is disconnected from passage 23 via cavity 178 in said slide valve and a cavity 180 in said slide valve opens passage 81 to atmosphere through a port 181 thereby venting chamber 75 in the interlock valve device 62. If the application of brakes on the locomotive is due to supply of fluid under pressure to the straight air pipe 2, the pressure of such fluid in chamber 74 of the interlock valve device 62 will then operate said diaphragm to close valve 89 and open valve 94, the closing of valve 89 closing the communication through which fluid under pressure was supplied to apply the locomotive brakes while the reason for opening valve 94 will hereinafter be brought out.

In the release position of the selector slide valve 37 a cavity 182 therein connects passage 26 from the relay valve device 7 to passage 48 leading to chamber 47 in the brake release valve device 28. Chamber 49 in the latter device is constantly open through the application and release pipe 52 to chamber 100 in the independent brake valve device and if the independent brake valve handle is depressed in its release position the chamber 49 will be open to atmosphere through the self-lapping valve mechanism 112. Hence with chamber 49 in the brake release valve device 28 vented spring 57 will hold the valve 53 open and permit release of fluid under pressure from the relay valve device 7 to atmosphere. In case of releasing an application of brakes due to fluid under pressure from the straight air pipe 2 the closing of valve 89 in the interlock valve and hence the cutting off of the supply of brake applying fluid will permit a complete release of the locomotive brakes past the open valve 53 in the release valve device 28. In case the application of brakes were a service application due to operation of the service portion 5 of the brake controlling valve device 4 said device will be in lap position cutting off supply of fluid under pressure to the relay, as well known, and a complete release of locomotive brakes will also occur past the open valve 53 in the release valve device 28.

If instead of effecting a complete independent release of locomotive brakes the engineer desires to merely reduce the degree of brake application on the locomotive, he will, at the same time as depressing the brake valve handle 107 or 161, move said handle into its application and release zone to a position corresponding to the degree of brake application which he desires to retain on the locomotive. Due to this operation of the brake valve handle a corresponding pressure will be provided in the application and release pipe 52 and hence in diaphragm chamber 49 of the independent release valve device 28. Hence pressure of fluid from the relay valve device 7 acting in chamber 47 of the release valve device 28 will merely reduce past the open valve 53 until slightly lower than that in chamber 49 whereupon the latter pressure will deflect diaphragm 46 to close valve 53 and retain a pressure in the relay valve device, and hence a degree of reduced brake application, corresponding to the position of the brake valve handle 107 or 161 in its application and release zone.

If with the brake valve handle 107 or 161 depressed and in the application and release zone the engineer moves said handle in steps back toward release position for reducing the pressure in the application and release pipe 52 in corresponding steps the independent release valve device 28, operating in the same manner as above described, will effect corresponding reductions in the degree of braking of the locomotive independently of the braking of cars in the train.

After the engineer has completely or partially released the brakes on the locomotive independently of those on cars of a connected train, as just described, he may remove his hand from the brake valve handle 107 or 161 and permit it to return to its upper position in which the actuating pipe 43 and thereby chamber 40 in the selector valve device 27 are vented. The selector slide valve 37 will then return to its normal or lower position breaking the vent from diaphragm chamber 75 in the interlock valve device 62 via the atmospheric port 181. If the application of brakes independently released, as just described, was due to fluid under pressure from the straight air pipe 2 which is still charged with fluid under pressure, the diaphragm chamber 75 will remain vented upon return of the selector slide valve 37 to its normal position via cavity 178 in said slide valve, passage 23 in the independent application and release valve device 12, passage 70 in the filler piece 14, past the valves 64 in the magnet valve device 61, through passage 72 in said filler piece 14, past the upper end of the double check valve 29 and thence through passages 24, 93, chamber 91 in the interlock valve device 62, past the open valve 94 and to atmosphere through passage 68. By thus holding chamber 75 vented upon return of the selector slide valve 37 to its normal position following an independent complete or partial release of locomotive brakes with the straight air pipe 2 still charged with fluid under pressure for applying the brakes on the train, the locomotive brakes will not automatically reapply by fluid under pressure from said pipe.

If it is desired to reapply the locomotive brakes from the straight air pipe 2 it is necessary for the engineer to intentionally operate his automatic brake valve device (not shown) to reduce the pressure in said pipe and hence in chamber 74 of the interlock valve device 62 down to a relatively low degree, such as five pounds, where spring 85 will return the diaphragm 73 to its upper position to permit closing of valve 94 and thereby the vent from chamber 75 and opening of valve 89 to reestablish communication between passages 79 and 93 in the filler piece 14 through which an electro-pneumatic straight air application of the locomotive brakes may then be effected in the same manner as above described.

On the other hand, if the brake application released by operation of the independent brake valve device were due to operation of the brake controlling valve device 4 in response to a reduction in pressure in brake pipe 1, then it is also necessary for the engineer to operate his automatic brake valve device (not shown) to cause reapplication of the locomotive brakes from the brake pipe 1 if such is desired.

In other words if the brakes on the locomotive are released by depressing the independent brake valve handle 107 or 161, a reapplication will not automatically occur upon relief of manual pressure on said handle.

The valve 153 in the independent brake valve device is closed except in the extreme position of handle 107 or 161 from its release position in its application and release zone in order that pressure may be obtained in the actuating pipe 43 for operating the selector slide valve 37 to its release position to permit independent release of locomotive brakes, as above described, to any desired degree less than a maximum independent application. The valve 153 is open in the extreme position, above mentioned, of handle 107 or 161 to insure in case of leakage of fluid under pressure past valve 129 (Fig. 2) or valve 166 (Fig. 7) into the actuating pipe 43, that the selector slide valve 37 will be in its normal position when a maximum independent application of locomotive brakes is desired in order to ensure that fluid supplied to the application and release pipe 52 will promptly become effective through cavity 179 in said slide valve, passage 58 and past the double check valve 30 in the relay valve device 7 for applying the locomotive brakes.

The independent brake valve handle 107 or 161 will remain depressed only when subject to manual pressure and thus insures that the selector valve 37 will be in its normal, lower position except when intentionally operated to effect an independent release of locomotive brakes on the locomotive. With the slide valve 37 in its lower position passage 26 from the relay valve device is disconnected from the independent release valve device 28 which insures that in case of an emergency reduction in pressure in brake pipe 2, the fluid under pressure supplied by consequent operation of the brake controlling valve device 4 to passage 26 will become effective in the relay valve device 7 to cause an emergency application of the fluid pressure brakes on the locomotive.

So far in the description it has been assumed that the dynamic brakes on the locomotive were ineffective and as a consequence the dynamic brake magnet 63 was deenergized and the valves 64 in their upper position as shown in the drawing.

Now assume that the dynamic brakes are cut into operation. The magnet 63 will as a result become energized and seat the valves 64 in their lower position. With the valves 64 in their lower position communication is closed between passages 70 and 72 so that if the fluid pressure brakes on the locomotive are released at the time the dynamic brakes are cut in, the fluid pressure brakes on the locomotive can not be applied as long as the dynamic brakes are in action.

However, assume that the fluid pressure brakes are applied at the time the dynamic brakes are cut into action. Under this condition the opening of chamber 65 to chamber 67 upon seating of the valves 64 in their lower position will release fluid under pressure from the relay valve device 7 via passages 25, 16 and 26, past the lower end of the double check valve 30, thence through passages 23 and 70, chamber 65, chamber 67 and passage 68 to atmosphere whereby the fluid pressure brakes on the locomotive will be released.

When the dynamic brakes on the locomotive are cut out of action it is not desired that the fluid pressure brakes automatically reapply. To prevent this in case the straight air pipe 2 is charged with fluid under pressure diaphragm chamber 75 in the interlock valve device 62 is vented upon energization of the dynamic brake magnet 63 via passages 80, 81, cavity 178 in the selector slide valve 37, passage 23 and past the magnet valves 64, so that the parts of the selector valve device 62 will be moved to their lower position by straight air pipe pressure in chamber 74 while the dynamic brakes are effective. When the dynamic brakes are cut out and the magnet 63 is consequently deenergized chamber 75 in the interlock valve device 62 will be held vented past the open valve 94 therein and through passage 67, thereby maintaining closed the communication through which a straight air application of the fluid pressure brakes on the locomotive occurs so that such an application can not automatically take place upon the dynamic brakes becoming ineffective. In order to apply the locomotive brakes from the straight air pipe 2 after the dynamic brakes are cut out it is therefore necessary to reduce the pressure in the straight air pipe 2 down to a low degree to reset the interlock valve device 62 as before explained, following which such an application may be effected by intentional operation of the operator's automatic brake valve device.

If an automatic application of fluid pressure brakes on the locomotive is in effect at the time the dynamic brakes are cut into operation and the magnet 63 is energized or if while the dynamic brakes are in action the brake controlling valve device 4 operates in response to a reduction in pressure in brake pipe 1 to supply fluid under pressure to passage 16 and past the lower end of the double check valve 29 to passage 72 which is closed off from passage 70 by the magnet valves 64 in their lower position, such fluid will be vented to atmosphere through choke 71 to passage 70 and thence past the upper unseated valve 64 and passage 68 whereby when the dynamic brake is cut out of action and the valves 64 move to their upper position there will be no fluid pressure in passage 72 to automatically cause an application of the locomotive brakes. To effect an automatic application of brakes under this condition the engineer's automatic brake valve device must be operated to reduce the pressure in the brake pipe and cause operation of the brake controlling valve device 4 to again supply fluid under pressure to passage 72.

While the dynamic brakes on the locomotive are in action however, an application of the fluid pressure brakes on the locomotive by operation of the independent brake valve device may be effected at any time, it being noted that when fluid under pressure is supplied to the application and release pipe 52 by operation of said brake valve device such fluid will flow through cavity 179 in the selector slide valve 37 to passage 58 leading to the upper end of the double check valve 30. The check valve 30 will be shifted to its lower position to disconnect passage 26 from passage 23, which latter passage is vented through passage 70 and past the magnet valves 64, whereby the fluid under pressure from passage 58 may become effective through passage 26 in the relay valve device 7 to apply the locomotive brakes. By reverse flow such fluid may be released from the relay valve device 7 to effect a release of the locomotive fluid pressure brakes upon suitable operation of the independent brake valve device, as will be apparent.

Whenever an emergency reduction in pressure in brake pipe 1 is effected the dynamic brakes, if effective, are adapted to be cut out of operation (by means not shown in the drawing) and the magnet 63 consequently deenergized whereby an emergency application of the fluid pressure brakes, in the manner above described, is assured.

It will be noted that plug 82 in the location in which it is shown in the drawing closes communication between passages 80 and 70 so that chamber 75 in the interlock valve device 62 will be vented upon movement of the selector slide valve 37 to its upper release position, in effecting an independent release of an electro-pneumatic straight air application of brakes, for causing operation of the selector valve device 62 to close communication between passages 79 and 93 so that the locomotive brakes will not reapply by fluid under pressure from the straight air pipe 2 upon removal of manual pressure on the brake valve handle 197 or 161 with consequent return of the selector slide valve 37 to its lower or normal position, as hereinbefore described. This feature may not be desired on certain locomotives, and if such be the case, the plug 82 may be removed from the location in which it is shown in the drawing and placed in the screw-threaded opening 83. With the plug 82 in opening 83 communication is closed between chamber 75 in the interlock valve device 62 and the selector slide valve 37 which eliminates the feature just mentioned, however, chamber 75 in the interlock valve device 62 is now open directly to passage 70 and will operate during dynamic braking and upon termination thereof as hereinbefore described.

As before mentioned, the brake equipment shown in Fig. 1 of the drawing is particularly adapted for use on locomotives of the diesel type in which the propulsion motors are adapted to act as generators to provide dynamic braking and which must haul trains on which the brakes are adapted to be controlled on either the automatic principle through the medium of a brake pipe 1 or on the electro-pneumatic straight air principle through the medium of a straight air pipe 2. The same brake equipment may be used on all locomotives but if a locomotive is not equipped for dynamic braking there is no need for the dynamic interlock magnet valve device 61, or if the locomotive is not for use in hauling trains with a straight air pipe 2 and not equipped for dynamic braking there is no need for either the magnet valve device 61 or interlock valve device 62, while if the locomotive is equipped for dynamic braking but is not to be used for hauling trains with a straight air pipe 2 and it is not desired to have the feature provided by the interlock valve device 62 in connection with dynamic braking there is no need for the interlock valve device 62. Accordingly only those parts necessary to provide the features desired for any particular locomotive need be provided for different locomotives.

For example if a locomotive is not equipped for dynamic braking the dynamic brake interlock magnet valve device 61 may be omitted and in its place a cover 183 (Fig. 6) applied, said cover having a cavity 184 for connecting passages 70, 72 in the filler piece whereby, except for dynamic braking, the equipment will operate in the same manner as above described.

If the feature provided by the interlock valve device 62 is not desired said device may be omitted and except for the omission of said feature the equipment will operate the same as above described. When the interlock valve device 62 is omitted from the equipment the mounting face 60 on the filler piece 14 will be covered by a cover 185 (Fig. 5).

In case a locomotive is not equipped for dynamic braking and is not to be used for controlling brakes through a straight air pipe 2 the whole filler piece 14 may be omitted and, except for the features thus removed, the equipment will operate the same as above described.

By the addition or removal of parts just described the brake equipment may be adapted to any locomotive and the particular type of service in which it is to be employed.

SUMMARY

It will now be seen that we have provided what may be called a universal locomotive brake equipment in that by the addition or omission of parts it may be adapted to any type of present day locomotive according to the class of service in which it is adapted to be used and according to the class of service the equipment embodies such interlocks as to avoid interference of one brake system with another yet insuring at all times the safety of the locomotive and connected cars of a train.

Having now described our invention what we claim as new and desire to secure by Letters Patent, is:

1. In a fluid pressure brake apparatus, in combination, brake applying means operable by fluid under pressure to effect an application of brakes, means for conveying fluid under pressure to operate said brake applying means, a control pipe, brake release means controlled by opposing pressures of fluid in a first chamber constantly open to said pipe and in a second chamber and operative by pressure of fluid in said second chamber to reduce the pressure therein to substantial equalization with that in said first chamber, an engineer's self-lapping brake valve device comprising a handle which is manually depressible and which is also movable horizontally in an application and release zone and which is operable by said handle in said zone to provide fluid in said pipe corresponding to the position of said handle in said zone, selector means controlling a communication between said brake applying means and said second chamber and means responsive to depression of said handle to effect operation of said selector means to open said communication and operable upon relief of pressure on said handle to effect operation of said selector means to close said communication.

2. In a fluid pressure brake apparatus, in combination, brake applying means operable by fluid under pressure to effect an application of brakes, means for conveying fluid under pressure to operate said brake applying means, a control pipe, brake release means controlled by opposing pressures of fluid in a first chamber constantly open to said pipe and in a second chamber and operative by pressure of fluid in said second chamber to reduce the pressure therein to substantial equalization with that in said first chamber, an engineer's self-lapping brake valve device comprising a handle which is manually depressible and which is also movable horizontally in an application and release zone and which is operable by said handle in said zone to provide fluid in said pipe at a pressure corresponding to the position of said handle in said zone, another control pipe, selector valve means operable in response to supply of fluid under pressure to said other control pipe to establish communication between said brake applying means and said second chamber and upon release of fluid under pressure from said other control pipe to close said communication, and means operable by depression of said handle to supply fluid under pressure to said other control pipe and upon relief of manual pressure on said handle to vent said other control pipe.

3. In a fluid pressure brake apparatus, in combination, brake applying means operable by fluid under pressure to effect an application of brakes and upon release of fluid under pressure a release of brakes, a passageway to which fluid under pressure is adapted to be supplied and from which fluid under pressure is adapted to be released a communication for conveying fluid under pressure between said passageway and said brake applying means, release means for releasing fluid under pressure from said brake applying means, interlock valve means for closing said communication off from said passageway, selector means for effecting such operation of said release means and interlock valve means, means for operating said interlock valve means to open said communication to said passageway upon release of fluid under pressure from said passageway, and means for controlling said selector means.

4. In a fluid pressure brake apparatus, in combination, brake applying means operable by fluid under pressure to effect an application of brakes, means for conveying fluid under pressure to said brake applying means, movable abutment means subject to opposing pressures of fluid in two chambers, valve means operable by said abutment means upon a preponderance in pressure of fluid in one of said chambers to reduce such pressure to substantially that in the other chamber, valve means for closing communication through said conveying means to said brake applying means, selector means for opening communication between said one chamber and said brake applying means and for at the same time effecting said operation of said valve means, and an engineer's brake valve device for effecting operation of said selector means and at the same time either opening said other chamber to atmosphere or supplying fluid thereto at any selected pressure.

5. In a fluid pressure brake apparatus, in combination, brake applying means operable by fluid under pressure to effect an application of brakes, means for conveying fluid under pressure to said brake applying means, release means for releasing fluid under pressure from said brake applying means, an engineer's brake valve device operative to effect operation of said release means, valve means for selectively opening and closing communication through said conveying means, and means responsive to said operation of said brake valve device to effect operation of said valve means to close communication through said conveying means and operative to open said communication in response to release of fluid under pressure from said conveying means on the side of said valve means opposite said brake applying means.

6. In a fluid pressure brake apparatus, in combination, brake applying means operable by fluid under pressure to effect an application of brakes, a passageway to and from which fluid under pressure is adapted to be supplied and released, respectively, interlock means comprising movable abutment means subject opposingly to pressure of fluid in a first chamber, open to said passageway, and pressure of fluid in a second chamber and operative upon substantial equalization of pressures in said chambers to open communication between said passageway and brake applying means upon venting of fluid under pressure from said second chamber with fluid under pressure present in said first chamber to close said communication, first and second control pipes, other movable abutment means subject opposingly to pressures of fluid in said first pipe and in a third chamber, release valve means operable by said other movable abutment means to reduce pressure of fluid in said third chamber to substantial equalization with pressure of fluid in said first pipe, selector means operable upon supply of fluid under pressure to said second pipe to open said brake applying means to said third chamber and to vent said second chamber and upon release of fluid under pressure from said second pipe to disconnect said brake applying means from said third chamber and to open said second chamber to said brake applying means, and an engineer's brake valve device for selectively supplying fluid under pressure to and releasing fluid under pressure from said second pipe and at the same time providing any desired pressure of fluid in said first pipe.

7. In a fluid pressure brake apparatus, in combination, brake applying means operable by fluid under pressure to effect an application of brakes, means for conveying fluid under pressure to said brake applying means, interlock valve means controlling communication through said conveying means comprising movable abutment means subject opposingly to fluid pressures in first and second chambers and operative upon substantial equalization of said opposing pressures to open said communication and upon release of fluid under pressure from said first chamber with pressure of fluid acting in said second chamber to close said communication and vent the portion of said communication connected to said brake applying means, means for opening said second chamber to said communication ahead of said interlock valve means including choke means for restricting flow of fluid under pressure to said second chamber and a communication by-passing and of greater capacity than said choke means for releasing fluid under pressure from said second chamber, a check valve in the last named communication for preventing flow of fluid under pressure therethrough to said second chamber, release means for releasing fluid under pressure from said brake applying means, selector means having one position for rendering said release means effective to vent fluid under pressure from said brake applying means and for venting said first chamber and having another position for rendering said release means non-operative to release fluid under pressure from said brake applying means and for opening said first chamber to said brake applying means, and an operator's control device for controlling the positioning of said selector means.

8. In a fluid pressure brake apparatus, in combination, brake applying means operable by fluid under pressure to effect an application of brakes and upon release of fluid under pressure to effect a release of brakes, a passageway adapted to be supplied with fluid under pressure and from which fluid under pressure is adapted to be released a communication for conveying fluid under pressure between said passageway and said break applying means, release means for releasing fluid under pressure from said brake applying means, interlock valve means for closing said communication off from said passageway, selector means for effecting such operation of said release means and interlock valve means, dynamic brake means for releasing fluid under pressure from said brake applying means and at the same time effecting said operation of said interlock valve means, means for operating said interlock valve means to open said communication to said passageway upon release of fluid under pressure from said passageway, and means for controlling said selector means.

9. In a fluid pressure brake apparatus, in combination, brake applying means operable by fluid under pressure to effect an application of brakes, a passageway to which fluid under pressure is adapted to be supplied and from which fluid under pressure is adapted to be released, means for establishing communication between said passageway and said brake applying means including interlock valve means controlling said communication and movable abutment means subject opposingly to pressures of fluid in a first chamber, open to said passageway, and in a second chamber and operative upon substantial equalization of pressures in said chambers to open said communication and adapted to be operated by pressure of fluid in said first chamber upon venting said second chamber to close said communication, brake release means controlled by opposing pressures of fluid in, respectively, third and fourth chambers and operable by pressure of fluid in said third chamber to reduce such pressure to substantially that in said fourth chamber, a first control pipe open to said fourth chamber, a second control pipe, selector means movable to one position in response to venting of said second pipe for opening said second chamber to the portion of said communication at the brake applying means side of said interlock valve means and for disconnecting said third chamber from said brake applying means and movable to another position upon supply of fluid under pressure to said second pipe for venting said second chamber and for opening said third chamber to said brake applying means, said interlock valve means operating to vent said portion of said communication upon venting of fluid under pressure from said second chamber with fluid under pressure present in said first chamber, a dynamic brake magnet device for selectively opening said communication between said interlock means and brake applying means and for closing such communication and venting the brake applying means side thereof, and an engineer's brake valve device for selectively supplying and releasing fluid under pressure to and from said second pipe and at the same time to and from said first pipe.

10. In a fluid pressure brake apparatus, in combination, brake applying means operable by fluid under pressure to effect an application of brakes, means for conveying fluid under pressure to said brake applying means, interlock means controlling communication through said conveying means comprising movable abutment means controlled by opposing fluid pressures in two chambers and operative upon substantial equalization of such pressures to open said communication and upon release of fluid under pressure from one of said chambers with fluid under pressure present in the second chamber to close said communication and open to atmosphere the portion of said communication at the brake applying means side of said interlock means, dynamic brake responsive means arranged to control said communication between said interlock means and brake applying means and selectively operative to either open the communication or to close the communication and open said brake applying means to atmosphere, brake release means for venting fluid under pressure from said brake applying means, selector means having one position for effecting operation of said brake release means and for venting said one chamber and another position for rendering said brake release means ineffective and for opening said one chamber to said brake applying means, and an operator's control device for controlling the positioning of said selector means.

11. In a fluid pressure brake apparatus, in combination, brake applying means operable by fluid under pressure to effect an application of brakes, means for conveying fluid under pressure to said brake applying means, interlock means controlling communication through said conveying means comprising movable abutment means controlled by opposing fluid pressures in two chambers and operative upon substantial equalization of such pressures to open said communication and upon release of fluid under pressure from one of said chambers with fluid under pressure present in the second chamber to close said communication and open to atmosphere the portion of said communication at the brake applying means side of said interlock means, dynamic brake responsive means arranged to control said communication between said interlock means and brake applying means and selectively operative to either open the communication or to close the communication and open said brake applying means to atmosphere, brake release means for venting fluid under pressure from said brake applying means, selector means having one position for effecting operation of said brake release means and another position for rendering said brake release means ineffective, a first passageway for opening said one chamber to said brake applying means, another passageway for opening said one chamber to said selector means, a plug selectively positionable in either one of said passageways for closing communication therethrough, said selector means in said one position opening said first passageway to atmosphere and in its other position opening said first passageway to said brake applying means, and an operator's control device for positioning said selector means.

12. In a fluid pressure brake equipment in which brakes are adapted to be controlled from either a brake pipe or a straight air pipe, the combination of brake applying means operable by fluid under pressure to effect an application of brakes, a brake controlling valve device comprising a pipe bracket, valve means carried by said bracket operative upon a reduction in brake pipe pressure to supply fluid under pressure for operating said brake applying means, a straight air pipe passage in said bracket adapted for connection with said straight air pipe for conveying fluid under pressure to operate said brake applying means, an independent application and release valve device removably carried by said bracket comprising a double check valve controlling communication between said valve means and straight air pipe passage which are connected, respectively, to opposite ends of said double check valve, and said brake applying means connected to the side outlet of said double check valve, and a release valve device comprising movable abutment means subject opposingly to pressures of fluid in first and second chambers and valve means operable by said abutment means upon a preponderance in pressure in said first chamber to reduce such pressure to substantial equalization with that in said second chamber, an application and release pipe connected to said bracket, an actuating pipe connected to said bracket, first and second passageways in said bracket for connecting said application and release pipe and said actuating pipe, respectively, to said independent application and release valve device, said independent application and release valve device further comprising a passageway opening said first passageway to said second chamber, and selector means operable upon supply of fluid under pressure to a third chamber to open said first chamber to said brake applying means and upon venting said third chamber to close communication between said first chamber and said brake applying means, and a passageway connecting said third chamber to said second passageway in said bracket which is open to said actuating pipe.

13. In a fluid pressure brake equipment in which brakes are adapted to be controlled from either a brake pipe or a straight air pipe, the combination of brake applying means operable by fluid under pressure to effect an application of brakes, a brake controlling valve device comprising a pipe bracket, valve means carried by said bracket operative upon a reduction in brake pipe pressure to supply fluid under pressure for operating said brake applying means, a straight air pipe passage in said bracket adapted for connection with said straight air pipe for conveying fluid under pressure to operate said brake applying means, an independent application and release valve device, a filler piece removably carried by said bracket and carrying said independent application and release valve device, a double check valve in said independent application and release valve device adapted to be subjected on opposite ends to pressure of fluid provided by said valve means and from said straight air pipe passage, respectively, for selectively establishing communication for the flow of such fluid pressure to a side outlet of said double check valve and thence to said brake applying means, interlock means removably carried by said filler piece controlling communication between said straight air pipe bracket passage and the respective end of said double check valve and operative to open such communication upon substantial equalization of opposing fluid pressures in first and second chambers and to close such communication upon venting of fluid under pressure from said second chamber when fluid under pressure is present in said first chamber, means opening said first chamber to said straight air pipe passage, said independent application and release valve device further comprising release means controlled by opposing pressures of fluid in third and fourth chambers and operative to reduce pressure of fluid in said third chamber to substantial equalization with pressure of fluid in said fourth chamber, a selector valve device movable to one position upon release of fluid under pressure from a fifth chamber for opening said second chamber to said brake applying means and closing communication between said brake applying means and said third chamber and movable to another position upon supply of fluid under pressure to said fifth chamber to open said third chamber to said brake applying means and said second chamber to atmosphere, an application and release pipe and an actuating pipe connected to said bracket, and means opening said application and release pipe and said actuating pipe through said bracket and filler piece to, respectively, said fourth chamber in said release means and to said fifth chamber in said selector valve device.

14. In a fluid pressure brake equipment in which brakes are adapted to be controlled from either a brake pipe or a straight air pipe, the combination of brake applying means operable by fluid under pressure to effect an application of brakes, a brake controlling valve device comprising a pipe bracket, valve means carried by said bracket operative upon a reduction in brake pipe pressure to supply fluid under pressure for operating said brake applying means, a straight air pipe passage in said bracket adapted for connection with said straight air pipe for conveying fluid under pressure to operate said brake applying means, an independent application and release valve device, a filler piece removably carried by said bracket and carrying said independent application and release valve device, a double check valve in said independent application and release device adapted to be subjected on opposite ends to pressure of fluid provided by said valve means and from said straight air pipe passage, respectively, for selectively establishing communication for the flow of such fluid pressure to a side outlet of said double check valve, a dynamic brake controlled device removably carried by said filler piece for selectively opening communication between said side outlet of said double check valve and said brake applying means or for closing such communication and opening said brake applying means to atmosphere, said independent appplication and release valve device comprising release valve means controlled by opposing pressure in two chambers and operative by pressure of fluid in a first of said chambers to reduce the pressure therein to substantial equalization with pressure of fluid in the second chamber, and selector means operative upon venting of fluid under pressure from a third chamber to close communication between said first chamber and said brake applying means and upon supply of fluid under pressure to said third chamber to open the last named communication, an application and release pipe and an actuating pipe connected to said bracket, and means opening said application and release pipe and said actuating pipe through said bracket and filler piece to, respectively, said second and third chambers.

15. In a fluid pressure brake equipment in which brakes are adapted to be controlled from either a brake pipe or a straight air pipe, the combination of brake applying means operable by fluid under pressure to effect an application of brakes, a brake controlling valve device comprising a pipe bracket, valve means carried by said bracket operative upon a reduction in brake pipe pressure to supply fluid under pressure for operating said brake applying means, a straight air pipe passage in said bracket adapted for connection with said straight air pipe for conveying fluid under pressure to operate said brake applying means, an independent application and release valve device, a filler piece removably carried by said bracket and carrying said independent application and release valve device, a double check valve in said independent application and release valve device adapted to be subjected on opposite ends to pressure of fluid provided by said valve means and from said straight air pipe passage, respectively, for selectively establishing communication for the flow of such fluid pressure to a side outlet of said double check valve, interlock means removably carried by said filler piece controlling communication between said straight air pipe bracket passage and the respective end of said double check valve and operative to open said communication upon substantial equalization of opposing fluid pressures in first and second chambers and to close said communication and vent the connection to the respective end of said double check valve upon venting of fluid under pressure from said second chamber when fluid under pressure is present in said first chamber, means opening said first chamber to said straight air pipe passage, said independent application and release valve device further comprising release means controlled by opposing pressures of fluid in third and fourth chambers and operative to reduce pressure of fluid in said third chamber to substantial equalization with pressure of fluid in said fourth chamber, and a selector valve device movable to one position upon release of fluid under pressure from a fifth chamber for opening said second chamber to said brake applying means and closing communication between said brake applying means and said third chamber and movable to another position upon supply of fluid under pressure to said fifth chamber to open said third chamber to said brake applying means and said second chamber to atmosphere, a dynamic brake controlled device removably carried by said filler piece for selectively opening communication between said side outlet of said double check valve and said brake applying means or for closing such communication and opening said brake applying means to atmosphere, an application and release pipe and an actuating pipe connected to said bracket, and means opening said application and release pipe and said actuating pipe through said bracket and filler piece to, respectively, said fourth chamber in said release means and said fifth chamber in said selector valve device.

16. In a fluid pressure brake apparatus, an engineer's independent brake valve device for controlling supply and release of fluid under pressure to and from an application and release pipe and an actuating pipe comprising in combination, a brake valve handle having a release position and movable therefrom horizontally into an application and release zone and also manually depressible, self-lapping valve means adjustable by said handle to open said application and release pipe to atmosphere in said release position and to provide fluid in said application and release pipe upon positioning of said handle in said zone at a pressure proportional to the distance of said handle from said release position, other valve means operable by manual depression of said handle to supply fluid under pressure to said actuating pipe and operative upon relief of manual pressure on said handle to vent said actuating pipe, and a third valve means operable by horizontal movement of said handle to its extreme position in said zone away from said release position to also vent said actuating pipe.

ERIK G. ERSON.
GLENN M. THOMAS.

References Cited in the file of this patent
UNITED STATES PATENTS

| Number | Name | Date |
|---|---|---|
| 2,445,680 | Linhart | July 20, 1948 |
| 2,464,977 | Gorman | Mar. 22, 1949 |